(12) United States Patent
Ezion et al.

(10) Patent No.: US 9,823,905 B2
(45) Date of Patent: Nov. 21, 2017

(54) EVENT BASED CODE GENERATION

(71) Applicants: International Business Machines Corporation, Armonk, NY (US); Sapiens Software Solutions (Decision) Ltd., Holon (IL)

(72) Inventors: Opher Ezion, Haifa (IL); Fabiana Fournier, Givat Ela (IL); Sarit Arcushin, Haifa (IL); Jeffrey M. Adkins, Beltsville, MD (US); Larry Goldberg, Cary, NC (US); Barbara von Halle, Mendham, NJ (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 14/076,986

(22) Filed: Nov. 11, 2013

(65) Prior Publication Data

US 2015/0135159 A1  May 14, 2015

(51) Int. Cl.
    *G06F 9/44* (2006.01)
(52) U.S. Cl.
    CPC . *G06F 8/35* (2013.01); *G06F 8/30* (2013.01)
(58) Field of Classification Search
    CPC ......................................................... G06F 9/44
    USPC ................................. 717/104, 106, 107, 108
    See application file for complete search history.

(56) References Cited

U.S. PATENT DOCUMENTS

| | | | |
|---|---|---|---|
| 5,446,885 A * | 8/1995 | Moore ................... | G06Q 40/08 |
| 5,650,947 A * | 7/1997 | Okumura ............ | G06F 17/5022 |
| | | | 703/16 |
| 5,691,917 A | 11/1997 | Harrison | |
| 5,987,514 A * | 11/1999 | Rangarajan ......... | H04L 41/0213 |
| | | | 709/224 |
| 6,065,009 A | 5/2000 | Leymann et al. | |
| 6,327,574 B1 * | 12/2001 | Kramer ............. | G06F 17/30893 |
| | | | 705/14.66 |
| 6,341,279 B1 | 1/2002 | Nye | |
| 6,421,667 B1 * | 7/2002 | Codd ........................ | G06F 9/44 |

(Continued)

FOREIGN PATENT DOCUMENTS

EP    1946254 A2    7/2008

OTHER PUBLICATIONS

IBM, "A conceptual model for event processing systems", IBM Red Book, REDP-4642-00, Mar. 29, 2010, 42 pages.

(Continued)

*Primary Examiner* — Jae Jeon (57) ABSTRACT

Techniques for generating software code for event processing applications are described herein. In one example, a method can include detecting, via a processor, a concept model, wherein the concept model comprises concept data related to an actor, an event, a domain, and a fact. The method can also include detecting, via the processor, a logic model comprising logic data related to event derivation and fact computation, wherein the logic model is not based on an operating environment. The method can also include creating, via the processor, a set of inferences that indicate a relationship between the concept data and the logic data. In addition, the method can include validating, via the processor, an accuracy of the logic model based on validation data, and generating, via the processor, software code based on the concept model and the logic model.

15 Claims, 4 Drawing Sheets

(56) References Cited

U.S. PATENT DOCUMENTS

| | | | |
|---|---|---|---|
| 6,594,637 B1* | 7/2003 | Furukawa | G06Q 10/063116 705/7.16 |
| 6,604,093 B1 | 8/2003 | Etzion et al. | |
| 6,745,203 B1* | 6/2004 | Garg | G06F 17/30607 |
| 7,340,477 B1* | 3/2008 | Tolbert | G06F 17/30592 |
| 7,523,137 B2 | 4/2009 | Kass et al. | |
| 7,613,676 B2* | 11/2009 | Baisley | G06Q 10/10 706/57 |
| 7,827,123 B1* | 11/2010 | Yagnik | G06N 99/005 706/12 |
| 8,073,801 B1 | 12/2011 | von Halle et al. | |
| 9,009,649 B2 | 4/2015 | Grechanik | G06F 8/36 707/765 |
| 2001/0018733 A1* | 8/2001 | Fujii | G06F 15/8023 712/16 |
| 2002/0100014 A1* | 7/2002 | Iborra | G06F 8/30 717/104 |
| 2002/0170035 A1* | 11/2002 | Casati | G06F 9/542 717/127 |
| 2003/0020749 A1* | 1/2003 | Abu-Hakima | G06Q 10/10 715/752 |
| 2004/0212505 A1* | 10/2004 | Dewing | A61B 5/0002 340/573.1 |
| 2005/0080806 A1* | 4/2005 | Doganata | G06F 11/0709 |
| 2005/0138111 A1* | 6/2005 | Aton | G06F 11/3476 709/201 |
| 2005/0283840 A1* | 12/2005 | Le Metayer | G06F 21/577 726/27 |
| 2006/0025987 A1* | 2/2006 | Baisley | G06F 17/271 704/4 |
| 2006/0026576 A1* | 2/2006 | Baisley | G06Q 10/10 717/143 |
| 2006/0248503 A1 | 11/2006 | Sabev | |
| 2006/0253416 A1* | 11/2006 | Takatsu | H04L 69/329 |
| 2006/0265577 A1* | 11/2006 | Sohm | G06F 11/3636 712/244 |
| 2007/0288419 A1* | 12/2007 | Strassner | G06N 5/02 706/55 |
| 2008/0086285 A1* | 4/2008 | Gombas | G06F 11/348 702/187 |
| 2010/0058343 A1* | 3/2010 | Kikuchi | G06Q 10/10 718/100 |
| 2010/0205138 A1* | 8/2010 | Zhang | G06N 7/02 706/52 |
| 2010/0324949 A1 | 12/2010 | Huang et al. | |
| 2011/0047192 A1* | 2/2011 | Utsunomiya | G06F 17/30067 707/809 |
| 2011/0160998 A1* | 6/2011 | Rissanen | G01C 21/3438 701/533 |
| 2011/0256842 A1* | 10/2011 | Spector | G06F 17/30864 455/404.1 |
| 2013/0066866 A1* | 3/2013 | Chan | G06F 17/30551 707/732 |
| 2013/0073625 A1* | 3/2013 | Umetsu | G06Q 10/1095 709/204 |
| 2015/0089045 A1* | 3/2015 | Agarwal | H04L 43/04 709/224 |

OTHER PUBLICATIONS

Waldemar Hummer, "Deriving a unified fault taxonomy for event-based systems", DEBS, year 2012, Proceedings of the 6th ACM International Conference on Distributed Event-Based Systems, 12 pages, ISBN: 978-1-4503-1315-5.

* cited by examiner

EVENT BASED CODE GENERATION

BACKGROUND

The present invention relates to generating software code, and more specifically, but not exclusively, to generating software code based on detected events.

SUMMARY

According to an embodiment described herein, a method is described that can generate software code. In one example, the method comprises detecting, via a processor, a concept model, wherein the concept model comprises concept data related to an actor, an event, a domain, and a fact. The method can also include detecting, via the processor, a logic model implemented with a first programming language comprising logic data related to event derivation and fact computation. Additionally, the method can also include creating, via the processor, a set of inferences that indicate a relationship between the concept data and the logic data. Furthermore, the method can include validating, via the processor, an accuracy of the logic model based on validation data and generating, via the processor, software code in a second programming language based on the concept model and the logic model.

According to another embodiment described herein, a system can generate software code. In one example, the system includes a memory device comprising processor executable instructions and a processor. In some embodiments, the processor can detect a concept model, wherein the concept model comprises concept data related to an actor, an event, a domain, and a fact. The processor can also detect a logic model implemented with a first programming language comprising logic data related to event derivation and fact computation. Additionally, the processor can create a set of inferences that indicate a relationship between the concept data and the logic data. Furthermore, the processor can validate an accuracy of the logic model based on validation data and generate software code in a second programming language based on the concept model and the logic model.

Another embodiment described herein includes a computer program product for generating software code based on event driven models that automate various processes, the computer program product comprising a computer readable storage medium having program code embodied therewith. In some examples, the program code is executable by a processing circuit to perform a method comprising detecting, by the processing circuit, a concept model, wherein the concept model comprises concept data related to an actor, an event, a domain, and a fact. In some embodiments, the method can also include detecting, by the processing circuit, a logic model implemented with a first programming language comprising logic data related to event derivation and fact computation, wherein the logic model is not based on an operating environment. Furthermore, the method can include creating, by the processing circuit, a set of inferences that indicate a relationship between the concept data and the logic data. Additionally, the method can include validating, by the processing circuit, an accuracy of the logic model based on validation data and generating, by the processing circuit, the software code in a second programming language based on the concept model and the logic model.

DETAILED DESCRIPTION

According to embodiments described herein, software code can be generated based on event driven models that automate various processes. For example, the software code may be based on a concept model and a logic model that include data that can automate the implementation of event driven logic. The logic model is based on concepts that can be implemented with any suitable computing device, software, firmware, or any combination thereof. In some embodiments, the concept model can include an actor, an event, a domain, and a fact. The concept model may be related to any suitable environment in which relationships between actors, facts, domains, and events are to be detected or generated. An actor, as described herein, can include any suitable computing device or user that generates input, receives output, or can be described within a predetermined domain. A domain, as described herein, can be any suitable characteristic or attribute that is shared by a set of facts. For example, a domain may indicate that a set of facts share a common data type or that the data values are within a predetermined range of values, among others. A fact, as described herein, can include information related to any suitable relationship between one or more actors and events and domains. In some embodiments, an event, as described herein, can include any suitable action that results in a transition of an actor from a first state to a second state. For example, an event may include detecting that an actor has provided input, or detecting that a fact indicates criteria have been met to transition another actor from a first state to a second state of the concept model.

In some embodiments, a logic model can detect data stored in the concept model and generate inferences based on the data in the concept model. Generating inferences can enable the derivation of events, and the translation of the concept model into a physical realization such as a computing device that can execute computer-readable instructions that implement the logic model. Translating the concept model into a physical realization can enable a computing device to find realized data elements and fetch data during the course of the event derivation. A logic model, as referred to herein, can include any suitable number of logical connections or relationships between the data from the concept model. In some examples, the logic model can generate events derived from actors and facts and the logic model may also detect additional relationships between actors, domains, facts, and events within the concept model. In some embodiments, the logic model can be implemented using a set of tables, or any suitable data structure.

Figure 1:
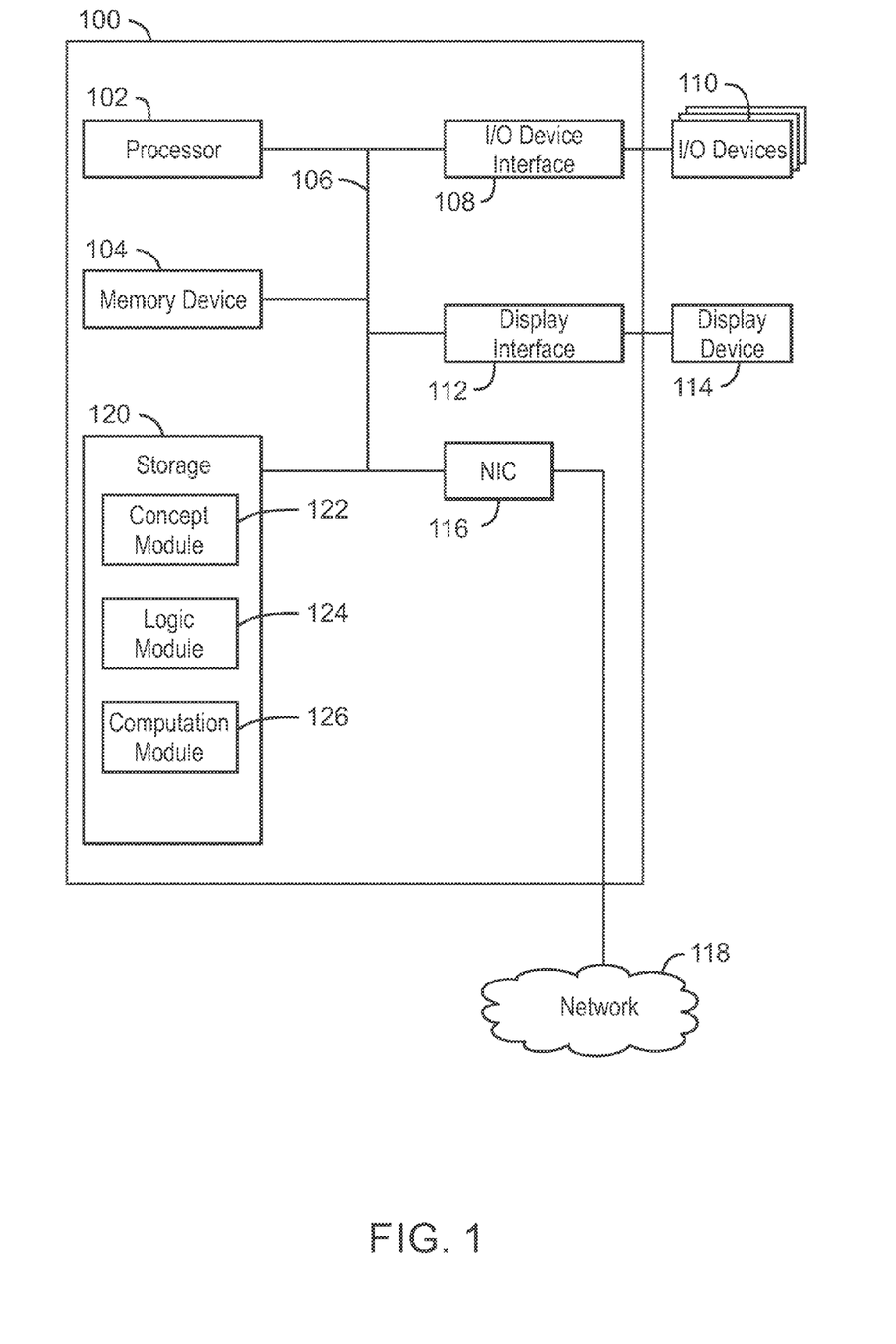
FIG. 1 is an example block diagram of a computing device that can generate software code based on a concept model and a logic model.

FIG. 1 is an example block diagram of a computing device that can generate software code based on a concept model and a logic model. The computing device 100 (also referred to herein as a local computing device) may be, for example, a computing phone, laptop computer, desktop computer, or tablet computer, among others. The computing device 100 may include a processor (also referred to herein as a processing circuit) 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can generate software code based on a concept model and a logic model.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others.

The processor 102 may also be linked through the system interconnect 106 to a storage device 120 that can include a hard drive, an optical drive, a USB flash drive, an array of drives, or any combinations thereof. The storage device 120 may include a concept module 122, a logic module 124, and a computation module 126. As discussed above, the concept module 122 may include concept data, which as referred to herein, includes data related to any suitable number of actors, events, domains, and facts. In some examples, the concept data for the concept module 122 can be stored in any suitable number of rows within a set of tables, charts, or with any suitable data type such as an array, a queue, or a linked list, among others. In some examples, the concept module 122 stores concept data in a concept lexicon table, a fact table, and an actor table. The tables are described in greater detail below in relation to FIG. 2.

In some embodiments, the concept module 122 can detect and store at least two types of facts such as domain facts and concrete facts. A domain fact, as referred to herein, can be any suitable fact that shares a characteristic with another fact. For example, a domain fact may share a common value range, default value, or data type with concrete facts associate with it. A concrete fact, as referred to herein, can be any suitable fact that pertains to a single actor, event, or domain. In some embodiments, domain facts and concrete facts can be derived using the logic module 124 or a computation module 126. A domain fact or a concrete fact can correspond to any suitable data such as an attribute in a database, a data structure in a file, or an abstract data type, among others.

The concept module 122 can also store any suitable number of domains that are associated with facts. A domain can include any suitable information related to a fact such as an indicator, text, date, time, quantity, money value, name, address, and the like. A domain value can be a list of values, a range of values, or any combination thereof. In some embodiments, the concept module 122 can detect and store default values for the domain values.

In some embodiments, the concept module 122 can detect and store actors by identifying nouns in text. For example, the concept module 122 may detect text from any suitable source such as documents stored in the storage device 120, or documents retrieved from a network through the NIC 116, among others. The concept module 122 may parse the documents and identify nouns within the documents. In some examples, the concept module 122 may label the identified nouns as actors and incorporate the identified nouns into the concept module 122. The identified noun may include any suitable computing device or user, among others.

In some examples, an actor can be associated with a particular role such as a producer, or consumer, among others. A producer role indicates that an actor may produce events that are to be a part of the logic module 124. As discussed below in relation to FIG. 2, the computation module 126 can derive events and additional information based on actors with a producer role. A consumer role indicates that an actor may consume an event or notification. For example, an actor associated with a consumer role may be any suitable actor that is involved with a derived event. In some embodiments, an actor and the role of the actor can be stored in any suitable table, chart, or data structure. In one example, the actor may have any one of the following roles: producer, consumer, or actuator. An actor with an actuator role may perform any suitable action such as generating input or output.

In some embodiments, a concept module 122 may also detect and store an event from any suitable document. The event may include any predicate or verb identified in the document. In some examples, an event can be generated by an actor that has a producer role. For example, an actor may produce an action that results in an event. In some embodiments, an event may also be derived using the computation module 126. For example, the computation module 126 may detect logic data in the logic module 124 that indicates a relationship between actors and events. In some examples, the computation module 126 may generate derived events whenever the computation module 126 detects relationships between the actors and events have satisfied a threshold condition. Generating derived events is described in greater detail below in relation to FIG. 2.

In some embodiments, the logic module 124 may store logic data related to events in an event derivation table. The characteristics associated with each event may include a timestamp that indicates a time an event occurred, a location where the event occurred, and information technology elements, such as hardware components or software components, that detect characteristics associated with the event, among others. In some examples, the events can also be grouped together to form a set of events based on shared event characteristics.

In some examples, the computation module 126 can generate a temporal indicator or a segmentation indicator that is associated with an event and any suitable number of facts. For example, a temporal indicator may indicate that an event occurs at a particular time or within a time period. The temporal indicator may also indicate any suitable number of facts associated with an event. A segmentation indicator may indicate a set of pre-conditions that may lead to the generation of a derived event. For example, a set of actors or facts may satisfy a threshold condition, which can result in a derived event. Generating derived events is described in greater detail below in relation to FIG. 2.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the concept module 122, the logic concept module 124, or the computation module 126 may be partially, or entirely, implemented in hardware and/or in the processor 102. For example, the functionality may be implemented with an application specific integrated circuit, in the logic implemented in an I/O device 110, or logic implemented in an embedded controller, among others.

Figure 2:
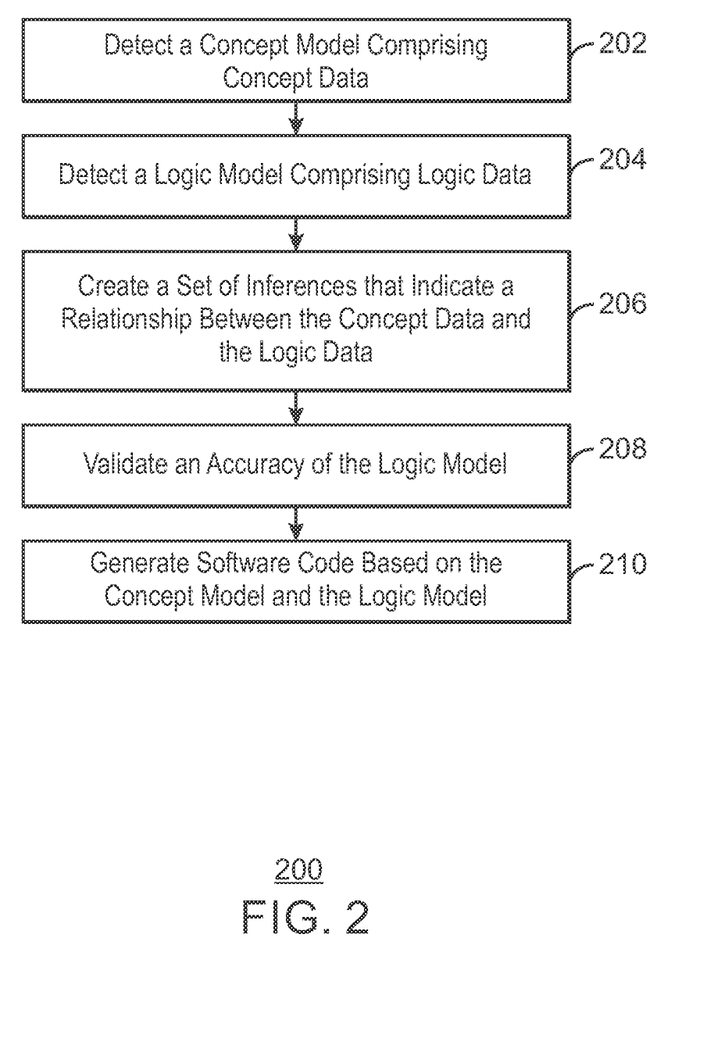
FIG. 2 is a process flow diagram of an example method for generating software code.

FIG. 2 is a process flow diagram of an example method for generating software code. The method 200 can be implemented with any suitable computing device, such as the computing device 100 of FIG. 1.

At block 202, the concept module 122 can detect a concept model, wherein the concept model comprises concept data related to an actor, an event, a domain, and a fact. In some embodiments, the concept data is stored in tables such as a fact table, and an actor table, among others. A fact table, as referred to herein, can include data related to a fact, whether the fact was detected or derived by the computation module 126, an associated event, a data type, and a domain value, among others. An actor table, as referred to herein, can include data related to an actor's name, a role, such as a producer or consumer, and a related event, among others.

At block 204, the logic module 124 can detect a logic model comprising logic data related to event derivation and fact computation, wherein the logic model is not based on an operating environment. An operating environment, as referred to herein, can include any suitable computing device in which the logic module 124 resides along with any combination of hardware components, software, and firmware, among others. In some examples, the logic module 124 can detect the logic model independently of the operating environment. Therefore, the logic module 124 may detect and implement the logic model related to an event based application with various operating systems, applications, processors, and programming languages. In some embodiments, the logic model can be implemented with any suitable programming language such as C, Java, Esper, Apama, and the like.

In some embodiments, the logic model can include logic data stored in an event derivation table, a computation table, and a transition table. The logic module 124 can store logic data in an event derivation table that includes an expression, a start condition for an event, an end condition for an event, and a partition. The logic data stored in the event derivation table may be compared to a threshold condition to determine if a derived event is to be generated. In some examples, the expressions in the event derivation table can include any suitable predicate that determines when a derived event may be generated. Predicates are described in greater detail below in relation to FIG. 3. The start condition for an event and end condition for an event can be any suitable time, or value, among others, that indicates a period of time in which an event may be generated. The event derivation table may also store partitions which indicate common characteristics that are to be shared by the events used to generate a derived event.

In some embodiments, the logic module 124 may also store data in a transition table that can indicate when an event transitions from one state to another state. For example, the logic module 124 may compare logic data stored in the event derivation table to a threshold condition to determine that the threshold condition has been satisfied. The logic module 124 may then search the transition table to determine a second state that is associated with a second set of concept data and a second set of logic data.

In some embodiments, the logic module 124 may also store logic data in a computation table that may include logic data related to calculating a value for a fact. For example, the computation table may include logic data that indicates a default value for a fact, an average of fact values, or a value within a domain, among others.

At block 206, the computation module 126 can create a set of inferences that indicate a relationship between the concept data and the logic data. For example, the computation module 126 may create a set of inferences that compute data values for facts associated with derived events, and timestamps for these facts, among others. In some embodiments, the computation module 126 may store the set of inferences in the event derivation table, computation table, or transition table. The computation module 126 may also generate derived events based on the set of inferences. In some examples, the computation module 126 can also modify or add new data to the computation table based on the set of inferences.

At block 208, the computation module 126 can validate an accuracy of the logic model based on validation data. In some examples, the validation data can include any suitable number of principles stated as assertions. In some embodiments, the computation module 126 can validate the accuracy of the logic model by using simulated validation data. For example, the computation module 126 may access stored validation data and compare the validation data to the results in the event derivation table.

At block 210, the computation module 126 can generate software code based on the concept model and the logic model. In some examples, the computation module 126 can generate event based software code that includes the values of facts associated with derived events and inferences based on the concept model and the logic model. In some embodiments, the software code can be generated in a programming language that is different than the programming language in which the logic model is implemented. For example, the software code may be generated in a programming language such as C, Java, Esper, Apama, and the like, while the logic model may be implemented with a different programming language such as Perl, among others.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the concept module 122 may also store concept data in a concept lexicon table. In some examples, the concept lexicon table can store concept data such as information technology elements that can detect concept data, and the type of concept data such as a fact, actor, or event, among others. An information technology element, as referred to herein, may be associated with any suitable event. The information technology element may refer to a hardware device, software, or any suitable combination thereof that can detect data related to an actor, event, fact, or domain. In some examples, the information technology element may refer to a hardware device such as a sensor or an actuator, among others. The information technology element may also refer to software such as a module, an application protocol interface, an operating system, or an application, among others. In some embodiments, the information technology element may also refer to an event, a file, a database, or a global variable, among others.

Figure 3:
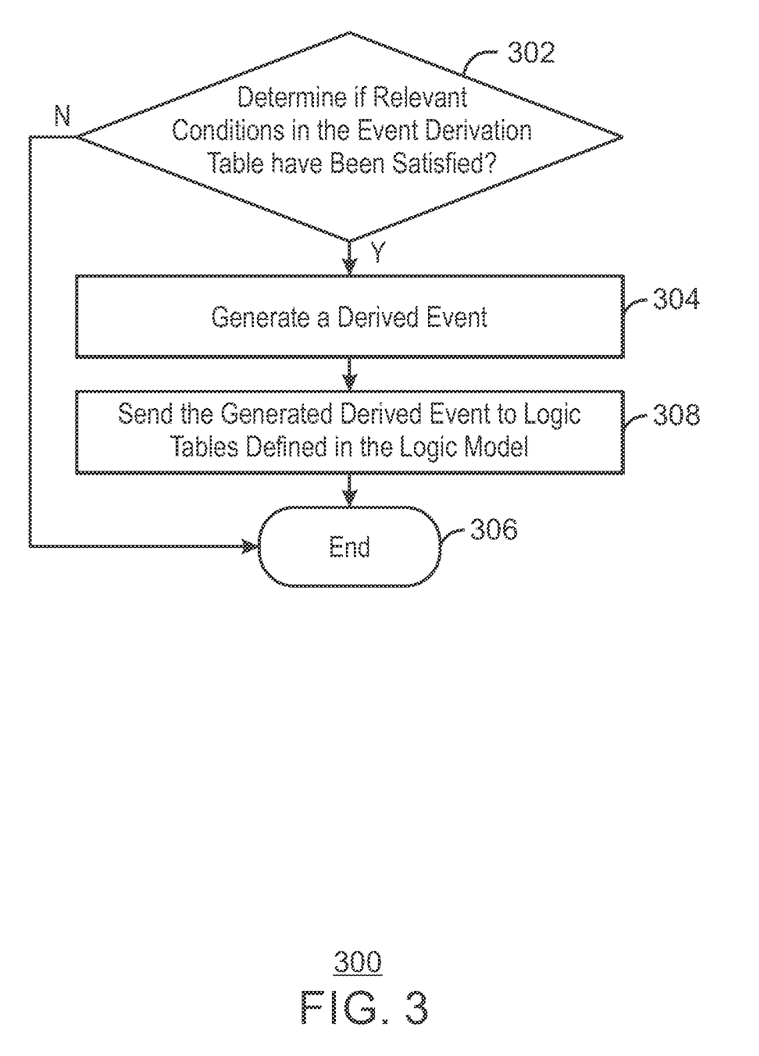
FIG. 3 is a process flow diagram of an example method for deriving an event.

FIG. 3 is a process flow diagram of an example method for deriving an event. The method 300 can be implemented with any suitable computing device, such as the computing device 100 of FIG. 1.

At block 302, the computation module 126 can determine if relevant conditions in an event derivation table have been satisfied. In some embodiments, the relevant conditions can include any suitable predicate that indicates a derived event is to be generated based on a fact or an event. In some examples, the predicate of a condition can include "is," "is not," "greater than," "less than," "occurs earlier than," "occurs later than," "is a member of," "contains," or "does not contain," among others. For example, the computation module 126 may detect that a fact satisfies a predicate such as the fact "is" a predetermined value, or a fact is "less than" a predetermined value, or a timestamp associated with a fact "occurs earlier than" a predetermined time, among others. The predicate may also indicate whether a fact "is a member of" a set of facts, or whether a set of facts "contains" or "does not contain" a fact.

In some embodiments, the predicate may also indicate that a derived event is to be generated based on a set of facts and/or events. For example, the computation module 126 may generate a derived event based on a predicate that compares a set of facts and/or events using comparisons such as "count," "sum," "average," "min," "max," "median," or "standard deviation," among others. The "count" predicate may indicate that a derived event is based on a set of facts in which a number of facts with a predetermined value exceeded a threshold. In some examples, the predicates "average," "min," "max," "median," and "standard deviation" can indicate that a derived event is to be generated if a mathematical calculation applied to a set of facts satisfies a threshold condition. For example, a threshold condition may indicate that a value calculated based on a predicate exceeds a predetermined threshold value, is equal to a predetermined threshold value, is below a predetermined threshold value, or is included within a range that includes a predetermined threshold value, among others.

In some embodiments, the computation module 126 can also generate derived events based on predicates related to patterns detected within any suitable number of facts and/or events. For example, the predicates related to patterns may include "increasing," "decreasing," "stable," or "mixed," among others. The computation module 126 may generate a derived event when a set of facts and/or patterns satisfy a threshold condition based on the predicate. In some examples, the computation module 126 can generate a derived event when a set of facts decrease in value within a period of time, a set of facts maintain values within a predetermined range for a period of time, or when a set of facts maintain values that increase within a period of time.

If any conditions in the event derivation table have been satisfied, the process flow continues at block 304. If conditions in the event derivation table have not been satisfied, the process flow ends at block 306.

At block 304, the computation module 126 can generate a derived event based on a satisfied condition. For example, if the computation module 126 detects a value based on a predicate, the computation module 126 can determine if the value satisfies a threshold condition. As discussed above, a threshold condition can include detecting that a value calculated based on a predicate is above a threshold value, below a threshold value, or within a range that includes a threshold value, among others. For example, the computation module 126 may generate a derived event if a fact value is above a threshold value, below a threshold value, or equal to a threshold value. As discussed above, the computation module 126 can also generate a derived event if a set of fact values satisfy a threshold condition.

At block 308, the computation module 126 sends the generated derived event to logic tables that are defined in the logic model that include the derived event as a participant, or to an actor that is defined in the concept model as the event consumer. In some examples, the generated derived event can be added to any suitable number of tables that store concept data or logic data. For example, the generated derived event may be added to a transition table that indicates an event is to transition from a first state to a second state when a threshold condition is satisfied. The process flow ends at block 308.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the computation module 126 can also generate a value for a fact using a computation table based on data in an event derivation table. In some embodiments, the computation table includes any suitable number of predicates that can generate values for facts. The predicates can include arithmetic operations, aggregation functions, copying a type of fact from an event, copying a first occurrence of an event, copying a last occurrence of an event, copying an event with a predetermined value or set of values, or appending fact values, among others.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
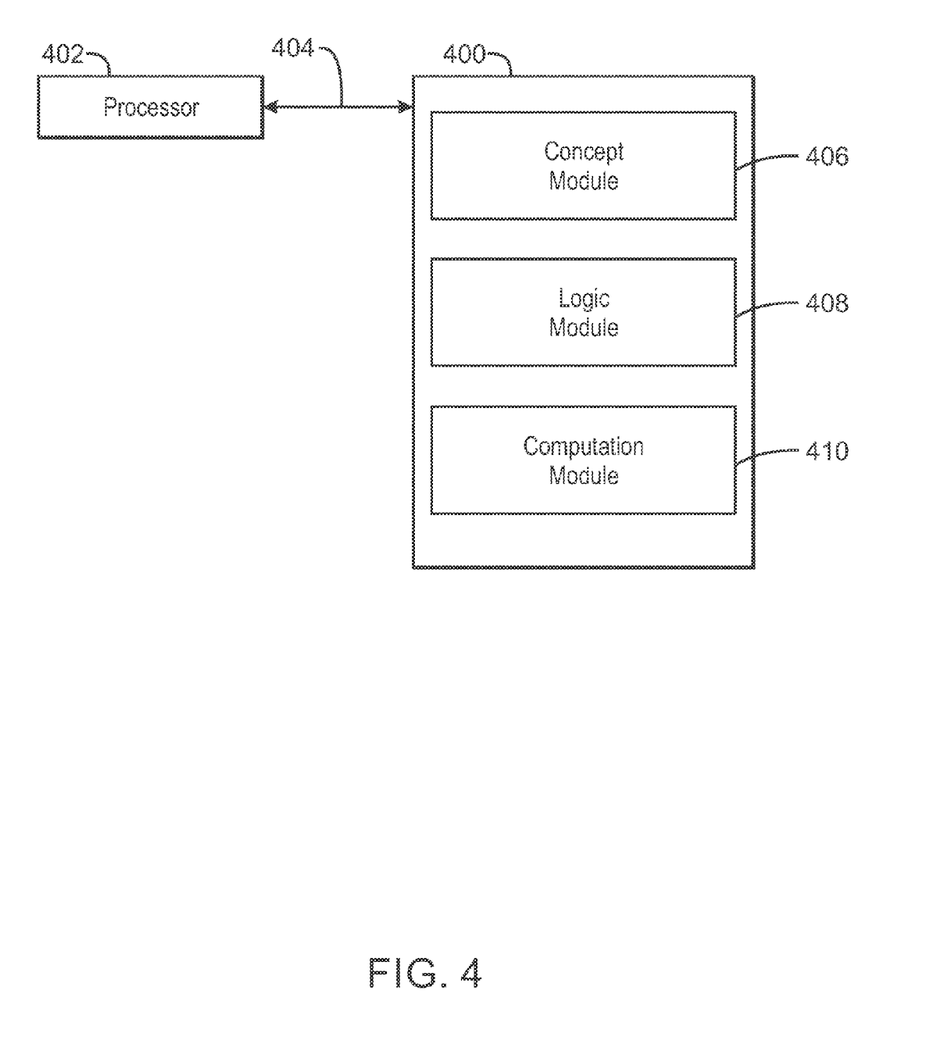
FIG. 4 is a block diagram depicting an example of a tangible, non-transitory computer-readable medium that can generate software code based on a concept model and a logic model.

Referring now to FIG. 4, a block diagram is illustrated which depicts an example of a tangible, non-transitory computer-readable medium that can generate software code based on a concept model and a logic model. The tangible, non-transitory, computer-readable medium 400 may be accessed by a processor (also referred to herein as a processing circuit) 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, a concept module 406 can detect and store data related to facts, actors, domains, and events. A logic module 408 can detect and store data related to relationships between the facts, actors, domains, and events. A computation module 410 can generate additional events and relationships between facts, actors, domains and events. In some embodiments, the computation module 410 can generate the additional events and relationships based on any suitable number of tables such as an event derivation table, a computation table, and a fact table, among others. In some examples, the information for the concept module 406 and logic module 408 can be stored in any suitable data type or data structure such as an array, a queue, or a linked list, among others.

It is to be understood that any combination of software components may be included in the tangible, non-transitory, computer-readable medium 400. Furthermore, any number of additional software components not shown in FIG. 4 may be included within the tangible, non-transitory, computer-readable medium 400, depending on the specific application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating software code, comprising:
   detecting, via a processor, a concept model, wherein the concept model comprises concept data related to an actor, a group of events, a domain, and a fact, wherein the concept data is stored in a concept lexicon table;
   detecting, via the processor, a logic model comprising logic data related to event derivation and fact computation, wherein the logic model is not based on an operating system, and wherein the logic model is to translate the concept model into a physical realization to enable a computing device to find realized data elements and fetch data during event derivation from information technology elements comprising a sensor or an actuator and wherein the logic model is to detect relationships between actors, domains, facts, and events within the concept model;
   determining that a condition in an event derivation table has been satisfied, the event derivation table storing, in part, the logic data;
   generating a derived event based on the satisfied condition, the satisfied condition based on a temporal indicator corresponding to a period of time, an expression, a start condition for each of the events, an end condition for each of the events, and a partition indicating at least one common characteristic shred by at least two events from the group of events used to generate the derived event;
   creating, via the processor, a set of inferences that indicate a relationship between the concept data and the logic data, the set of inferences further comprising data values corresponding to facts defined in the concept model and associated with the derived events in the event derivation table;
   validating, via the processor, an accuracy of the logic model based on validation data; and
   generating, via the processor, software code based on the concept model, the logic model, the derived event, and the set of inferences, wherein the software code is generated in a different programming language than a programming language used for the logic model.

2. The method of claim 1, wherein the fact corresponds to an attribute in a database, a data structure in a file, or an abstract data type.

3. The method of claim 1, wherein the logic data is stored in part in a computation table.

4. The method of claim 1, comprising:
   generating a value for the fact based on the computation table; and
   storing the value for the fact in a fact table.

5. The method of claim 1, comprising:
   detecting a threshold condition to transition from one state to the next state for each of the events; and
   storing the threshold condition in a transition table.

6. The method of claim 5, wherein the threshold condition is based on a predicate related to a mathematical operation.

7. A system comprising: a memory device comprising processor executable instructions; and a processor to:
   detect a concept model, wherein the concept model comprises concept data related to an actor, a group of events, a domain, and a fact, wherein the concept data is stored in a concept lexicon table;
   detect a logic model implemented with a first programming language comprising logic data related to event derivation and fact computation, wherein the logic model is not based on an operating system of the system, and wherein the logic model is to translate the concept model into a physical realization to enable a computing device to find realized data elements and fetch data during event derivation from information technology elements comprising a sensor or an actuator and wherein the logic model is to detect relationships between actors, domains, facts, and events within the concept model;
   determine that a condition in an event derivation table has been satisfied, the event derivation table storing, in part, the logic data;
   generate a derived event based on the satisfied condition, the satisfied condition based on a temporal indicator corresponding to a period of time, an expression, a start condition for each of the events, an end condition for each of the events, and a partition indicating at least one common characteristic shared by at least two of the events used to generate the derived event;
   create a set of inferences that indicate a relationship between the concept data and the logic data, the set of inferences further comprising data values corresponding to facts defined in the concept model and associated with the derived events in the event derivation table;
   validate an accuracy of the logic model based on validation data; and
   generate software code in a second programming language based on the concept model, the logic model, the derived event, and the set of inferences.

8. The system of claim 7, wherein the concept data is stored in part in an actor table and a fact table.

9. The system of claim 7, wherein the logic data is stored in part in a computation table.

10. The system of claim 7, wherein the processor is to:
    generate a value for the fact based on the computation table; and
    store the value for the fact in a fact table.

11. The system of claim 7, wherein the processor is to:
    detect a threshold condition to transition from a first state to a second state for each of the events; and
    store the threshold condition in a transition table.

12. The system of claim 11, wherein the threshold condition is based on a predicate related to a mathematical operation.

13. A non-transitory computer program product for generating software code, the computer program product comprising a computer readable storage medium having program code embodied therewith, the program code executable by a processing circuit to perform a method comprising:
    detecting, by the processing circuit, a concept model, wherein the concept model comprises concept data related to an actor, a group of events, a domain, and a fact, wherein the concept data is stored in a concept lexicon table;
    detecting, by the processing circuit, a logic model implemented with a first programming language comprising logic data related to event derivation and fact computation, wherein the logic model is not based on an operating system, and wherein the logic model is to translate the concept model into a physical realization to enable a computing device to find realized data elements and fetch data during event derivation from information technology elements comprising a sensor or an actuator and wherein the logic model is to detect relationships between actors, domains, facts, and events within the concept model;

determining that a condition in an event derivation table has been satisfied, the event derivation table storing, in part, the logic data;

generating a derived event based on the satisfied condition, the satisfied condition based on a temporal indicator corresponding to a period of time, an expression, a start condition for each of the events, an end condition for each of the events, and a partition indicating at least one common characteristic shared by at least two of the events used to generate the derived event;

creating, by the processing circuit, a set of inferences that indicate a relationship between the concept data and the logic data, the set of inferences further comprising data values corresponding to facts defined in the concept model and associated with the derived events in the event derivation table;

validating, by the processing circuit, an accuracy of the logic model based on validation data; and generating, by the processing circuit, the software code in a second programming language based on the concept model, the logic model, the derived event, and the set of inferences.

14. The non-transitory computer program product of claim 13, the program code executable by the processing circuit to perform a method comprising:

detecting a threshold condition to transition from a first state to a second state for each of the events; and storing the threshold condition in a transition table.

15. The non-transitory computer program product of claim 14, wherein the threshold condition is based on a predicate related to a mathematical operation.

* * * * *